Patented Oct. 19, 1954

2,692,208

UNITED STATES PATENT OFFICE 2,692,208

OIL BASE PAINT COMPOSITION

William G. Fisher, Champaign, Ill.

No Drawing. Application July 16, 1952,
Serial No. 299,241

5 Claims. (Cl. 106—252)

This invention relates to a composition for addition to varnishes and oil-base paints to prevent peeling thereof, and to the improved varnish and paint products so produced.

Varnish and oil-base paints are extensively used as protective coatings for wood and metal surfaces and as long as the coating is intact, the protection afforded is quite adequate. However, it has been found that such coatings crack, blister and peel after a period of time, particularly when exposed to severe weathering conditions or when the surface coated is undried or unseasoned wood, or wood which is, by nature, resinous or sappy. As a result, such coatings have to be renewed frequently at a considerable expenditure of time, labor and money.

It is, therefore, a principal object of the present invention to provide a varnish or oil-base paint which, when applied as a protective coating, will not crack, blister or peel even after extended periods of exposure to all types of weathering conditions.

A further important object of the invention is the provision of a composition which, when added to varnishes and/or oil-base paints will prevent peeling thereof.

Another object of the invention is the provision of a varnish or oil-base paint which may be applied as a protective coating to coated or uncoated surfaces and which will adhere thereto without peeling for extended periods of time.

Still another object of the invention is the provision of a varnish or oil-base paint which may be applied over a previous coating which has become somewhat scaly without scraping or otherwise removing the scales.

In accordance with the invention, the improved varnish or oil-base paint is prepared by mixing therewith a composition consisting of a mixture of an organic solvent, such as benzol, aliphatic alcohol, such as methyl alcohol, glycerine, turpentine and linseed oil. The linseed oil and turpentine constitute the major ingredients of the mixture and will generally not be less than about 90% by weight of the mixture with a ratio of linseed oil to turpentine of from about 8.5 to 1 to about 10 to 1. The benzol, alcohol and glycerine are included in relatively minor amounts and will generally constitute less than 10% by weight of the mixture.

A specific example of a composition, which has been found to give very satisfactory results, is as follows:

| Ingredient: | Parts by weight |
|---|---|
| Benzol | 1 |
| Methyl alcohol | 2 |
| Glycerine | .25 |
| Turpentine | 12 |
| Pure raw linseed oil | 112 |

The above formula or composition is quite satisfactory for most purposes. However, where the paint is to be applied over several coats of previously applied paint which is peeling, the additive composition should contain a somewhat greater proportion of the minor ingredients of benzol, methyl alcohol and glycerine. For example, utilizing the same parts by weight of turpentine and linseed oil previously given, the amounts of benzol, methyl alcohol, and glycerine may be increased up to about 3, 6 and 3 parts, respectively. The specific amounts and proportions of ingredients will, of course, be largely dependent upon the type and condition of the surface to be coated. In general, it has been found that most satisfactory results are obtained within the following percentage ranges of ingredients, and hence, these are preferred:

| Ingredients: | Percentage range |
|---|---|
| Benzol | 0.8 to 2.2 |
| Methyl alcohol | 1.6 to 4.4 |
| Glycerine | 0.2 to 2.2 |
| Turpentine | 8.8 to 9.5 |
| Linseed oil | 82.4 to 88.0 |

While the above ranges are preferred, conditions may be encountered where it will be desirable to exceed them somewhat. However, in all variations of the composition, the benzol, methyl alcohol and glycerine should be maintained in relatively minor proportions to the turpentine and linseed oil.

The specific ingredients enumerated are also preferred, since they have been found to give excellent results. This does not mean, however, that equivalent materials which perform equivalent functions in the composition may not be substituted for some of the ingredients. For example, while benzol or benzene is the preferred organic solvent, it is possible to substitute a similar type of organic solvent which performs equivalent functions in the composition. Likewise, it is contemplated that other alcohols of a similar nature, for example, ethyl alcohol, may be substituted for the methyl alcohol.

In preparing the composition, care must be taken to see that the glycerine is added to the raw linseed oil before the other ingredients are added, since if it is prepared and mixed otherwise, a reaction may be caused, resulting in a slight explosion. The preparation and mixing of the composition may readily be carried out by mixing the glycerine and the linseed oil in one operation, the benzol, methyl alcohol and turpentine in another operation, and then combining and mixing the two mixtures so formed. Alternatively, the glycerine and raw linseed oil may first be mixed and the other ingredients added thereto and mixed therewith in any desired order.

The above composition may be packaged and sold for addition to ready-mixed oil base paints and varnishes, or, alternatively, may be used with a mixture of white lead to produce the paint itself in form ready to be used. The preferred mixture for most purposes will consist of one and one-half quarts of the composition added to one gallon of any ready-mixed oil base paint, or one gallon of the composition added to 20 pounds of white lead. Where the paint is to be used on a building or surface having a history of extreme peeling or which will be subjected to rather severe weathering conditions, an additional amount of the composition should be added up to about 2 quarts per gallon of ready-mixed paint and about 2 gallons per 20 pounds of white lead.

The composition of the invention may be used in any oil base paint and also in varnish. It should not be used in water paints or rubber-based paints.

When the composition of the invention is incorporated with an oil-base paint as hereinabove indicated, it accomplishes two things: (1) it prevents peeling where the paint is used originally, i. e., on an uncoated surface; and (2) it stops peeling where other paints have been used prior to its application. These accomplishments are due to the cooperative action of the various ingredients of the composition, and while I do not desire to be bound by any particular theory, it is my belief that the benzol and methyl alcohol soften and break down the scaly paint, resins and other materials so that the turpentine, acting as a penetrating agent, may force the pure raw linseed oil through the old paint and bind it to the wood or metal. The glycerine retards the drying until the oil has had time to reach the wood or metal, and in addition, keeps the paint, as a whole, flexible and from ever becoming brittle and breaking. Paint containing the composition will set, dust-free, in from 4 to 6 hours, which is somewhat longer than the ordinary oil-based paint. If a second coat is used, it should not be applied for from 30 to 60 days.

The improved varnish or paint containing the composition of the invention may be applied in the usual manner as by brushing, spraying, or the like. Brushing, however, is the best known and preferred method of application. The composition may be applied to a surface in its raw state and will not damage or injure the same. However, the surface so treated should then be coated with an oil-base paint in the usual manner.

It will thus be seen that the present invention provides a novel and highly effective composition which, when added to varnishes and oil-based paints and applied as a coating, prevents peeling of same and stops peeling of a previously applied coating. While a specific adaptation of the invention has been described, it should not be construed as limited thereto, except as covered in the appended claims.

I claim:

1. An additive composition for varnishes and oil-based paints consisting essentially of a mixture containing from about 0.8 per cent to about 2.2 per cent benzol, from about 1.6 per cent to about 4.4 per cent methyl alcohol, from about 0.2 per cent to about 2.2 per cent glycerine, from about 8.8 per cent to about 9.5 per cent turpentine, and from about 82.4 per cent to about 88.0 per cent pure raw linseed oil.

2. An oil-base paint consisting essentially of a mixture of white lead with a composition containing from about 0.8 per cent to about 2.2 per cent benzol, from about 1.6 per cent to about 4.4 per cent methyl alcohol, from about 0.2 per cent to about 2.2 per cent glycerine, from about 8.8 per cent to about 9.5 per cent turpentine, and from about 82.4 per cent to about 88.0 per cent linseed oil, the proportion of composition to white lead in the mixture being equivalent to from 1 to 2 gallons of the composition to 20 pounds of white lead.

3. A coating composition consisting essentially of a ready-mixed oil-based paint to each four parts by volume of which has been added from about one and a half to two parts by volume of a composition containing the following ingredients in the indicated proportions:

| | Per cent |
|---|---|
| Benzol | 0.8 to 2.2 |
| Methyl alcohol | 1.6 to 4.4 |
| Glycerine | 0.2 to 2.2 |
| Turpentine | 8.8 to 9.5 |
| Pure raw linseed oil | 82.4 to 88.0 |

4. A composition for addition to varnishes and oil-based paints consisting essentially of 1 part benzol, 2 parts methyl alcohol, 0.25 parts glycerine, 12 parts turpentine, and 112 parts pure raw linseed oil, the parts being by weight.

5. A composition for addition to varnishes and oil-based paints consisting essentially of 3 parts benzol, 6 parts methyl alcohol, 3 parts glycerine, 12 parts turpentine, and 112 parts pure raw linseed oil, the parts being by weight.

References Cited in the file of this patent

UNITED STATES PATENTS

| Number | Name | Date |
|---|---|---|
| 895,248 | Gallagher | Aug. 8, 1908 |
| 1,150,516 | Greene | Aug. 17, 1915 |
| 1,472,402 | Snyder | Oct. 30, 1923 |
| 1,779,183 | McGregor | Oct. 21, 1930 |
| 1,958,374 | Schwarcmau | May 8, 1934 |